J. A. MALM.
GRAIN PAN FOR THRESHING MACHINES.
APPLICATION FILED FEB. 2, 1916.
1,224,188.
Patented May 1, 1917.
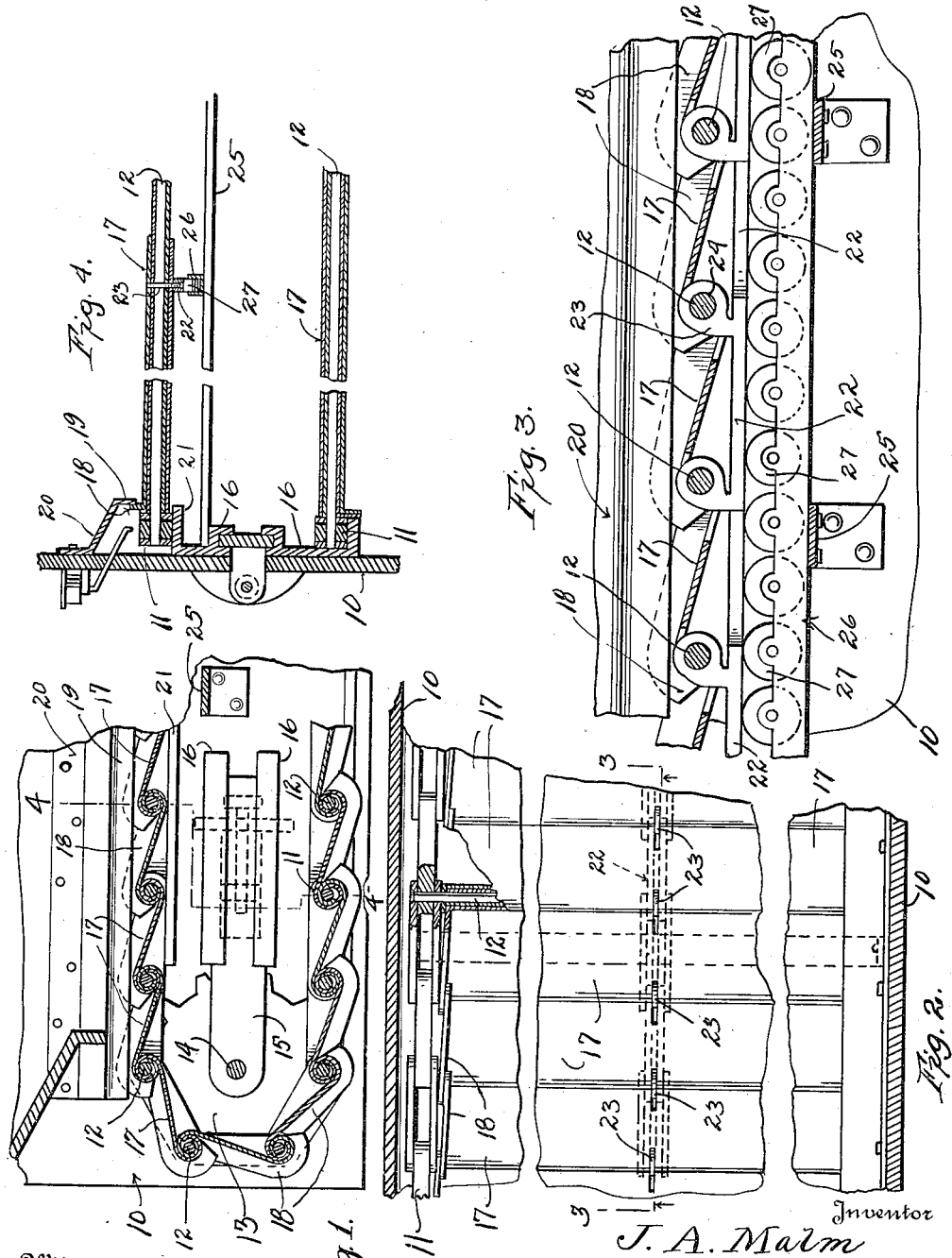

UNITED STATES PATENT OFFICE.

JOHN A. MALM, OF DIAMOND, SOUTH DAKOTA.

GRAIN-PAN FOR THRESHING-MACHINES.

1,224,188.     Specification of Letters Patent.     Patented May 1, 1917.

Application filed February 2, 1916. Serial No. 75,738.

*To all whom it may concern:*

Be it known that I, JOHN A. MALM, a citizen of the United States, residing at Diamond in the county of Roberts, State of South Dakota, have invented certain new and useful Improvements in Grain-Pans for Threshing-Machines; and I do hereby declare the following to be a full, clear, and exact description of the invention, such as will enable others skilled in the art to which it appertains to make and use the same.

This invention relates to grain pans for threshing machines.

The object of the invention is to provide an improved construction of grain pan which will effect rapid movement of the grain and thereby avoid being loaded down to an undesirable extent, and which will not allow the grain to slide down one side of the pan in the event the threshing machine does not set level.

A further object of the invention is to provide a grain pan of the type named which may be easily cleaned from beneath a threshing machine and which will be generally efficient in operation.

With the above and other objects in view the invention consists in the details of construction and in the arrangement and combination of parts to be hereinafter more fully described and particularly pointed out in the appended claim.

In describing the invention in detatil reference will be had to the accompanying drawings wherein like characters of reference denote corresponding parts in the several views, and in which—

Figure 1 is a longitudinal section through one end of a grain pan constructed in accordance with the invention;

Fig. 2, a plan view of what is shown in Fig. 1;

Fig. 3, an enlarged section on the line 3—3 of Fig. 2, and

Fig. 4, a partial transverse section through the grain pan.

Referring to the drawings 10 indicates the sides of a threshing machine with which the improved grain pan is associated.

The grain pan is shown as comprising spaced endless chains 11 connected by rods 12 which serve as the pivotal connections between the links of the chains. These chains 11 travel on sprocket wheels 13 which are fixed on shafts 14 rotatably mounted in bearings 15. These bearings 15 are adjustably mounted on bracket plates 16 secured to respective sides 10 and whereby the chains may be tightened as will be obvious. The body of the pan is formed of a plurality of sheet metal plates 17 the ends of which are curved about the rods 12 as clearly shown in Fig. 1 and whereby the necessary flexibility is imparted to the pan to permit same to turn about the sprocket wheels 13. The side edges of the plates 17 are provided outwardly extending flanges 18 which bear against the inner sides of the vertically extending portions 19 of shield plates 20 which latter are secured to respective sides 10. By this construction it will be obvious that even though the threshing machine is not level no grain can pass over the side portions of the pan. The bracket plates 16 are provided respectively with laterally extending portions 21 which serve to support the chains 11.

In order to support the upper reach of the grain pan there is provided a plurality of rail sections 22 each of which includes arms 23 rotatably engaged on adjacent rods 12 and extending through suitable openings 24 in the plates 17. The bracket plates 16 are connected by bridge members 25 which support a bar 26 having a U-shaped cross section. Rotatably mounted between the arms of this bar are a plurality of rollers 27 which are engaged by the rail sections 22 during the travel of the pan and thus afford a support for the central portion of the upper reach of the pan.

What is claimed is:—

A conveyer comprising spaced endless traveling chains, rods connecting said chains and forming the pivots of the links thereof, a plurality of metal plates having their ends rotatably engaged around adjacent rods, a plurality of rail sections, lateral extensions adjacent respective ends of each rail section rotatably engaged on adjacent rods, a bar supported beneath the upper reach of said chains, and rollers mounted on said bar and engaged by said rail sections.

In testimony whereof, I affix my signature, in the presence of two witnesses.

JOHN A. MALM.

Witnesses:
HOMER A. LEAVITT,
HUBERT M. LEAVITT.

Copies of this patent may be obtained for five cents each, by addressing the "Commissioner of Patents, Washington, D. C."